(12) United States Patent
Dudash et al.

(10) Patent No.: US 7,503,951 B2
(45) Date of Patent: Mar. 17, 2009

(54) FUME CHAMBER

(75) Inventors: Gerald A. Dudash, Willoughby, OH (US); David Fedor, Cleveland Hts., OH (US); Jason R. Sattesson, Euclid, OH (US); Mitchell L. Shellenberger, Mount Joy, PA (US)

(73) Assignee: Lincoln Global, Inc., City of Industry, CA (US)

( * ) Notice: Subject to any disclaimer, the term of this patent is extended or adjusted under 35 U.S.C. 154(b) by 660 days.

(21) Appl. No.: 11/079,712

(22) Filed: Mar. 14, 2005

(65) Prior Publication Data

US 2006/0201118 A1 Sep. 14, 2006

(51) Int. Cl.
B05B 15/12 (2006.01)

(52) U.S. Cl. ........................ 55/385.1; 55/385.2; 55/437; 55/465; 55/471; 55/DIG. 18; 55/DIG. 29; 55/DIG. 46; 134/12; 134/21; 134/31; 134/107; 134/111; 454/187

(58) Field of Classification Search ................ 55/385.1, 55/385.2, DIG. 18, DIG. 29, DIG. 46, 437, 55/465, 471; 134/12, 21, 31, 107, 111; 454/187
See application file for complete search history.

(56) References Cited

U.S. PATENT DOCUMENTS

| 4,315,458 | A | * | 2/1982 | Hudson, III | 454/65 |
|---|---|---|---|---|---|
| 4,756,728 | A | * | 7/1988 | Conrad | 55/385.2 |
| 5,277,652 | A | * | 1/1994 | Minor | 454/52 |
| 5,281,246 | A | * | 1/1994 | Ray et al. | 55/302 |
| 5,306,332 | A | * | 4/1994 | Allen | 95/273 |
| 5,318,474 | A | * | 6/1994 | Klassen et al. | 454/296 |
| 5,336,128 | A | * | 8/1994 | Birdsong | 454/56 |
| 5,733,187 | A | * | 3/1998 | Bowe | 454/52 |
| 5,769,912 | A | * | 6/1998 | Mansur | 55/385.1 |
| 6,027,566 | A | * | 2/2000 | Telchuk et al. | 118/326 |
| 6,182,653 | B1 | * | 2/2001 | Otenbaker et al. | 126/299 R |
| 2003/0089087 | A1 | * | 5/2003 | Reid et al. | 55/385.1 |

* cited by examiner

Primary Examiner—Duane S Smith
Assistant Examiner—Minh-Chau T Pham
(74) Attorney, Agent, or Firm—Fay Sharpe LLP

(57) ABSTRACT

A system for measuring fume generation rates and total fume emissions of welding and allied processes includes a fume collection chamber and an automated welding assembly. The fume collection chamber includes a fume chamber housing, a door attached to the housing, a filter support connected to the housing, a hood connected to the housing and a connector attached to the housing and/or the hood. The automated welding assembly includes a rail, a carriage moveably mounted on the rail, a gun arm connected to the carriage and a welding gun mounted to the gun arm.

45 Claims, 8 Drawing Sheets

FUME CHAMBER

BACKGROUND OF THE INVENTION

A welding fume collection process that meets the Laboratory Method for Measuring Fume Generation Rates and Total Fume Emission of Welding and Allied Processes, ANSI/AWS F1.2-92 and AWS F1.2:1999 uses a fume collection chamber. With reference to FIG. 1, a known fume collection chamber A includes a circular chamber housing B upon which a conical hood C is permanently welded. The conical hood C communicates with a vacuum source, which is provided by an air line hose D connected to a Venturri apparatus, to provide an airflow in the chamber so that welding fumes can be collected.

A primary filter E is disposed inside and near the top of the conical hood C. The primary filter E is sealed by compressing the filter around a rubber gasket F attached to a screen G, which is attached to the conical hood C. The primary filter E is made from a material that can allow the passage of fine particles in the fume emissions, especially during the initial start up of the test. Accordingly, a secondary filter H is disposed in a cylindrical filter housing I that is in communication with the conical hood C. The air line D also communicates with the secondary filter housing I so that air is drawn through the housing. Welding is performed on a turntable J disposed in the housing.

Loading and changing of the primary filter E requires tilting back nearly the entire assembly on hinges K. Removal and installation of the primary filter E is done from inside the chamber. During a test, the primary filter E can fall out of the gasket F and/or lose its seal, whereby an airflow path can develop bypassing the primary filter, which results in an unusable test. While running the test, one is unable to determine whether the primary filter E has fallen out or lost its seal. Furthermore, emissions that pass through both the filters E and H can travel through the air line hose D en route to a muffler (not shown), which can result in blockage in the muffler and loss of vacuum pressure in the chamber. Also, airflow through the chamber is difficult to regulate.

SUMMARY OF THE INVENTION

A system for measuring fume generation rates and fume emissions of welding and allied processes that overcomes at least some of the aforementioned problems is disclosed. A fume collection chamber assembly for use in such a system includes a fume chamber housing, a door attached to the housing, a filter support connected to the housing, a hood movably connected to the housing and a connector attached to the housing and/or the hood. The fume chamber housing includes an opening for receiving a welding gun arm. The door provides access to the inside of the housing. The hood provides access to a filter supported by the filter support. The connector is configured to communicate with a vacuum source.

A system for measuring fume generation rates and total fume emissions of welding and allied processes includes a fume collection chamber and an automated welding assembly. The fume collection chamber can be similar to that described above and/or can include a plurality of connected side walls, a hood mounted to at least one of the walls, a door attached to at least one of the walls and a filter support mounted to at least one of the walls. At least one side wall includes a gun opening. The hood and/or one of the side walls includes a fume opening to allow an airflow generator to communicate with the fume collection chamber. The automated welding assembly includes a rail, a carriage moveably mounted on the rail, a gun arm connected to the carriage and a welding gun mounted to the gun arm. The gun arm extends through the gun opening.

According to another embodiment, a fume collection chamber assembly includes a chamber housing, a first movable structure connected to the housing, a filter support connected to the chamber housing, a second movable structure connected to the housing and a welding table disposed in the chamber housing. The first movable structure is configured to provide access to inside the chamber housing. The second movable structure is configured to provide access to the filter support from outside the chamber housing.

DETAILED DESCRIPTION OF THE INVENTION

Figure 1:
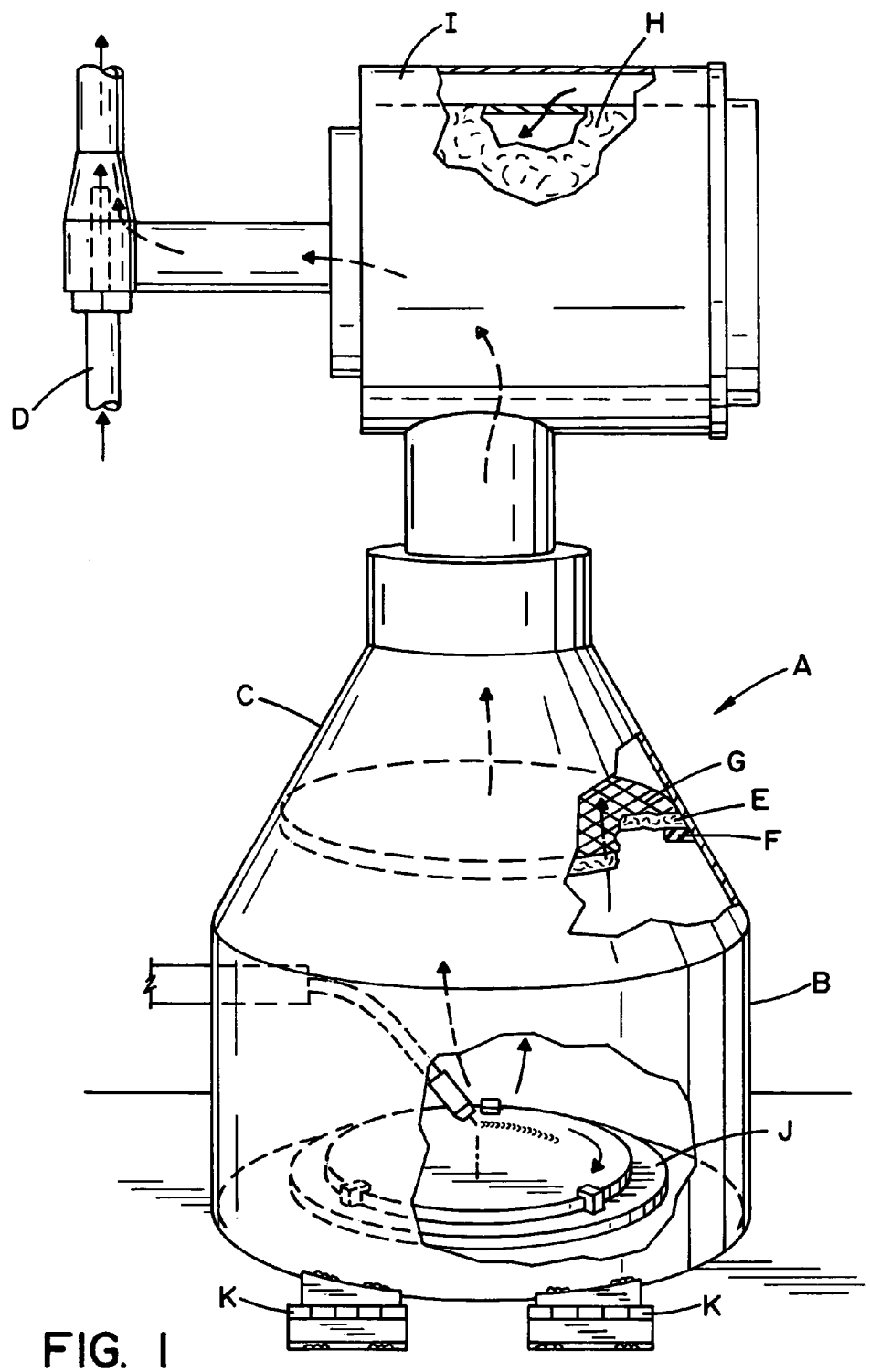
FIG. 1 is an elevation view, partially broken away, of a known fume collection chamber.
Figure 2:
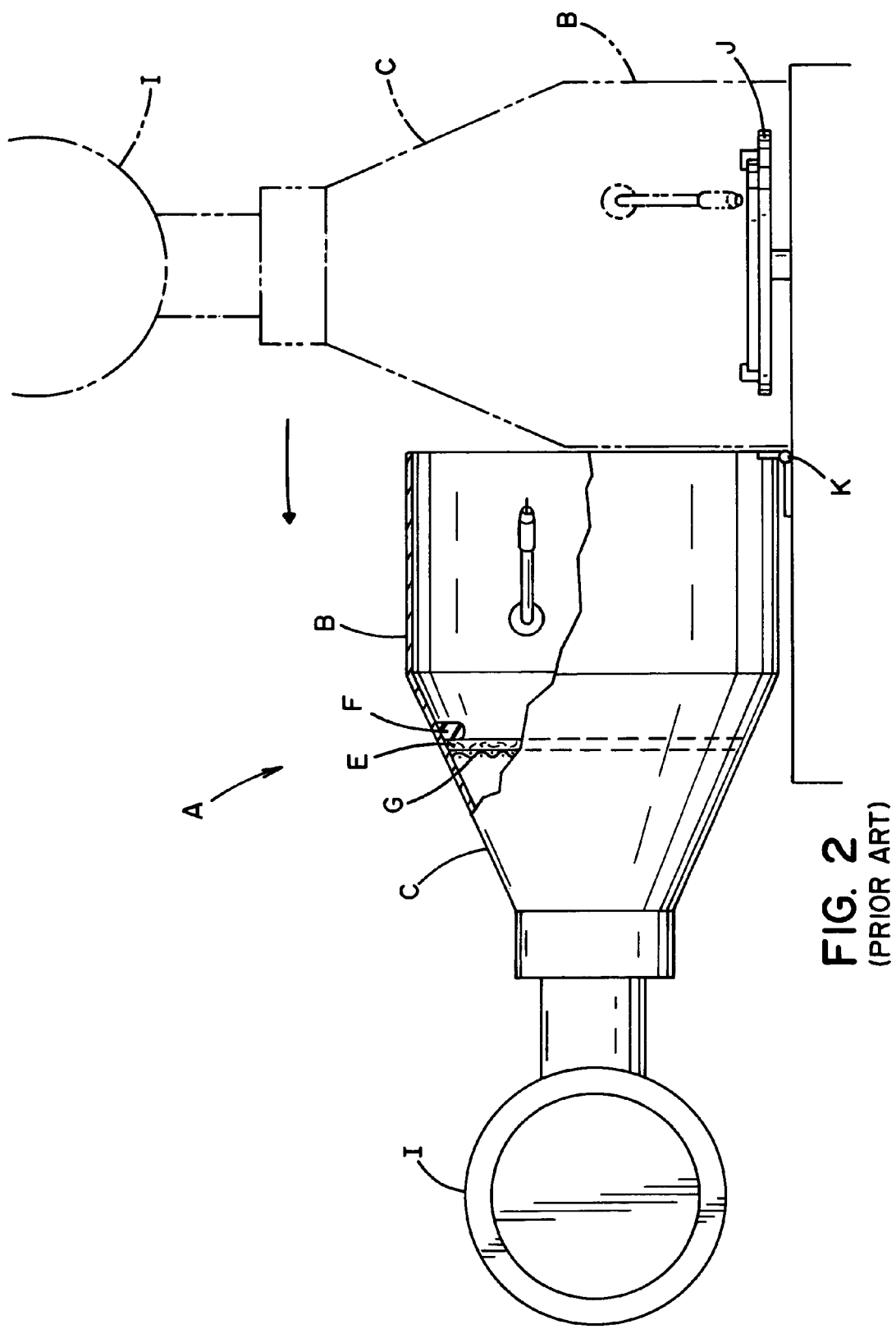
FIG. 2 is a view of the fume collection chamber tilted back on hinges to show removal and/or installation of a primary filter.
Figure 3:
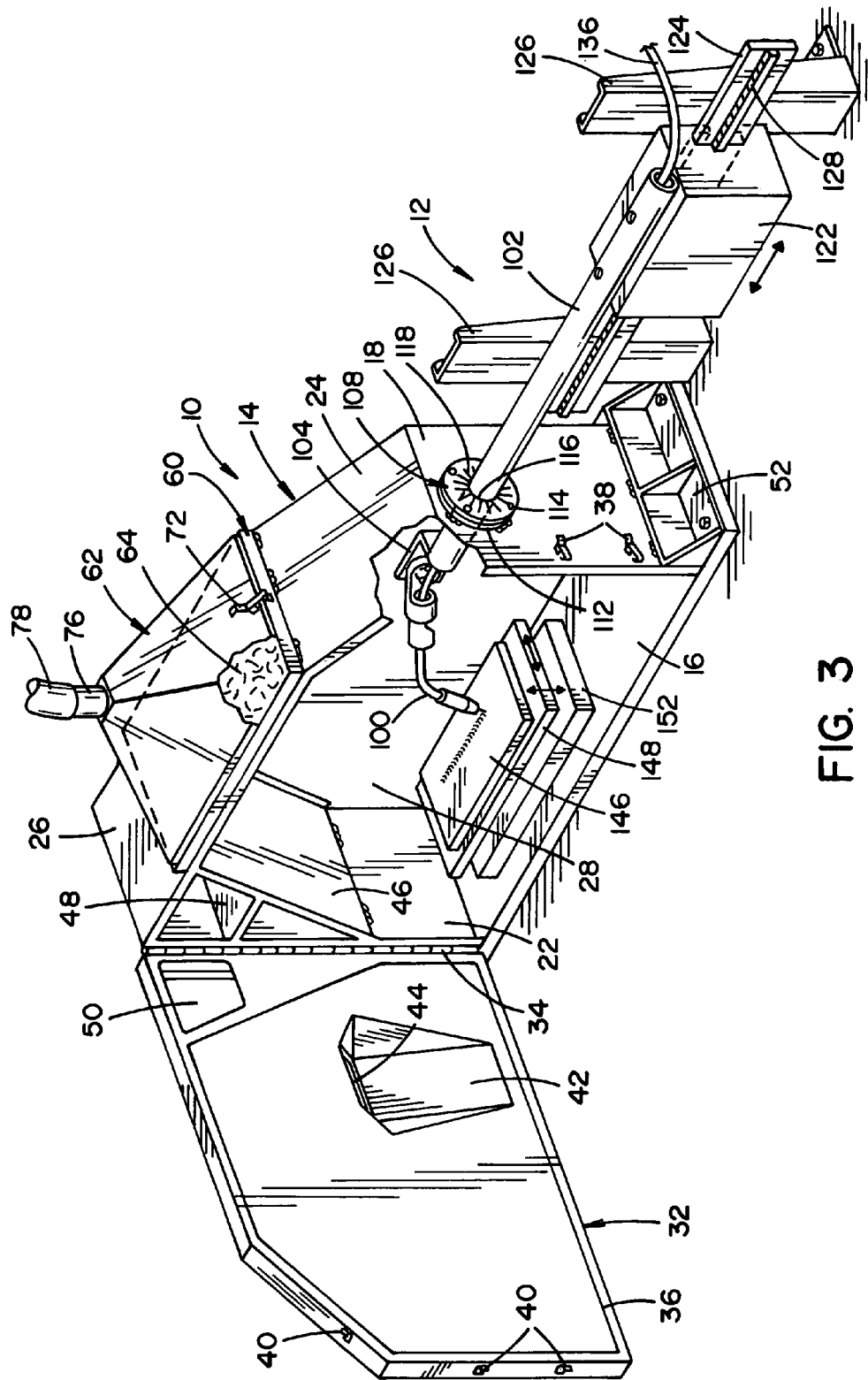
FIG. 3 is perspective view of a system for measuring fume generation rates and total fume emissions of welding and allied processes where the system includes a fume collection chamber and an automated welding assembly, and portions of the fume collection chamber are broken away.

With reference to FIG. 3, an improved system for measuring fume generation rates and total fume emissions of welding and allied processes includes a fume collection chamber 10 and an automated welding assembly 12. The fume collection chamber 10 includes a chamber housing 14 made up of a plurality of walls including a rectangular base wall 16, a first side wall 18, a second side wall 22, an angled upper wall 24, a top wall 26 and a rear wall 28. The first side wall 18 and the second side wall 22 are parallel to one another and extend upwardly and normal to the base wall 16. The angled upper wall 24 extends upwardly at an angle to the first side wall 18. The top wall 26 extends from the second side wall 22 parallel to the base 16. The rear wall 28 extends upwardly from and normal to the base wall 16 and interconnects the base wall 16, the first side wall 18, the second side wall 22, the angled upper wall 24, and the top wall 26. In the depicted embodiment, the walls of the chamber housing 14 are made from sheet metal and are welded together to limit any fumes from escaping at the joints or seams of interconnected walls. The lower housing 14 is depicted as having a generally box-like configuration; however, the lower housing can take other configurations also, including cylindrical A door 32 pivotally connects to the second side wail 22 via a vertical hinge 34. The door 32 is a moveable structure that provides easy access to the inside of the lower housing 14 and is appropriately shaped to enclose the housing. Alternatively, the door 32 can attach elsewhere to the chamber housing 14. A gasket 36 is provided on the door 32 around its periphery so that the door 32 can seal against the housing 14. Alternatively, the gasket can be provided on the appropriate side walls of the lower housing 14. Toggle clamps 38 are provided on the first side wall 18 and the slanted upper wall 24 (FIG. 4) that cooperate with hooks 40 on the door 32 to provide for a secure closure of the door 32. The gasket 36 and the toggle clamps 38 and hooks 40 provide for tight seal of the lower chamber housing; however, other conventional closing and/or latching mechanisms can also be used to securely close the door. The door 32 includes a window panel 42 and a viewing window 44. The window can be made from an auto darkening glass and/or permanently dark glass. An angled baffle 46 connects to the second side wall 22 and the top wall 26.

A horizontal shelf 48 connects to and spans the first side wall 22 and the angled baffle 46. An opening 50 is provided through the door 32 to provide access to the shelf 48 when the door is closed. Tools and other instruments useful in welding fume tests can be stored on the horizontal shelf 48. The opening 50 in the door 32 provides easy access to the tools and other instruments, whether the door is closed or open.

Figure 4:
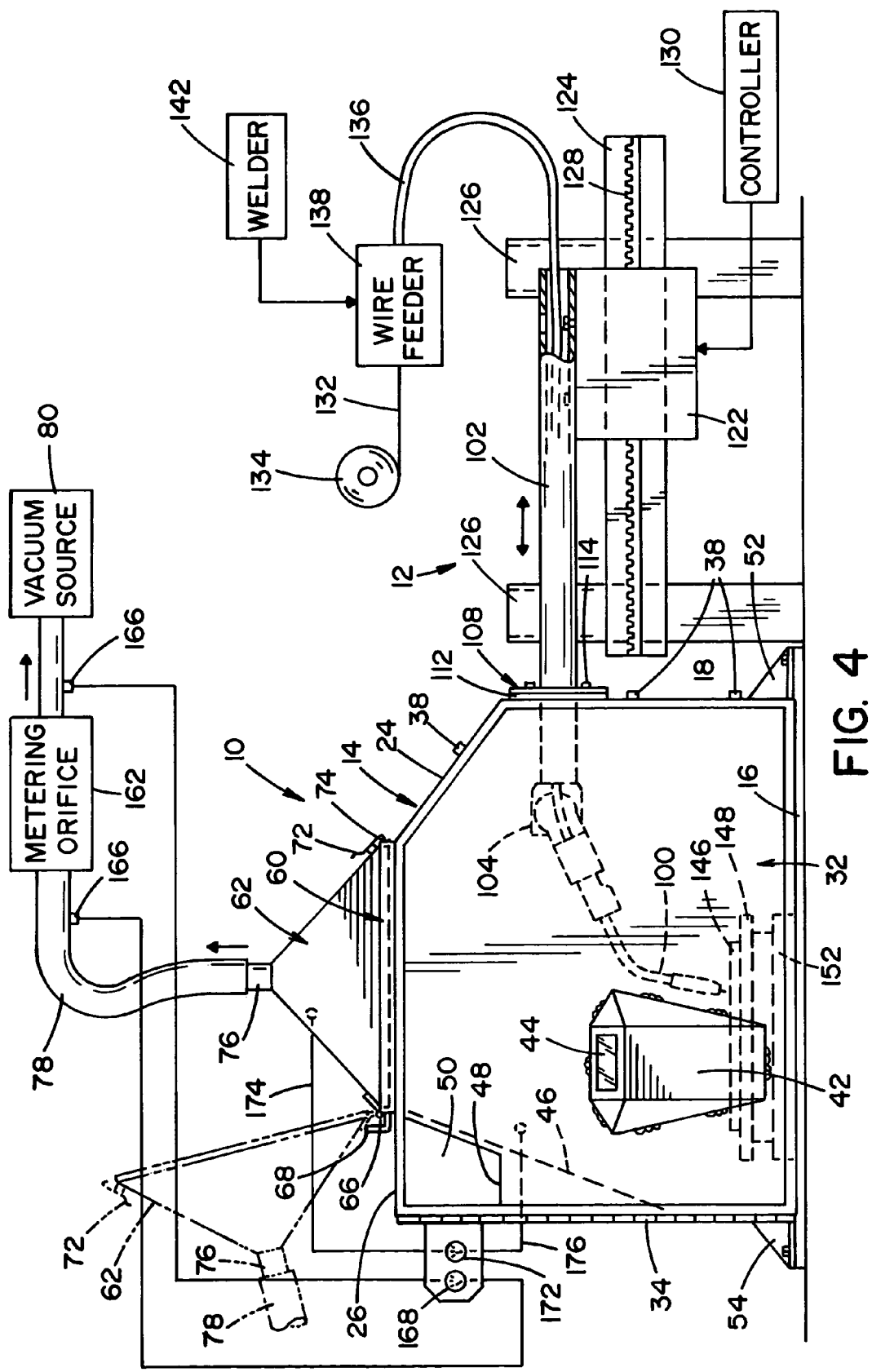
FIG. 4 is front view of the system of FIG. 3 where some additional components of the system are depicted schematically.
Figure 5:
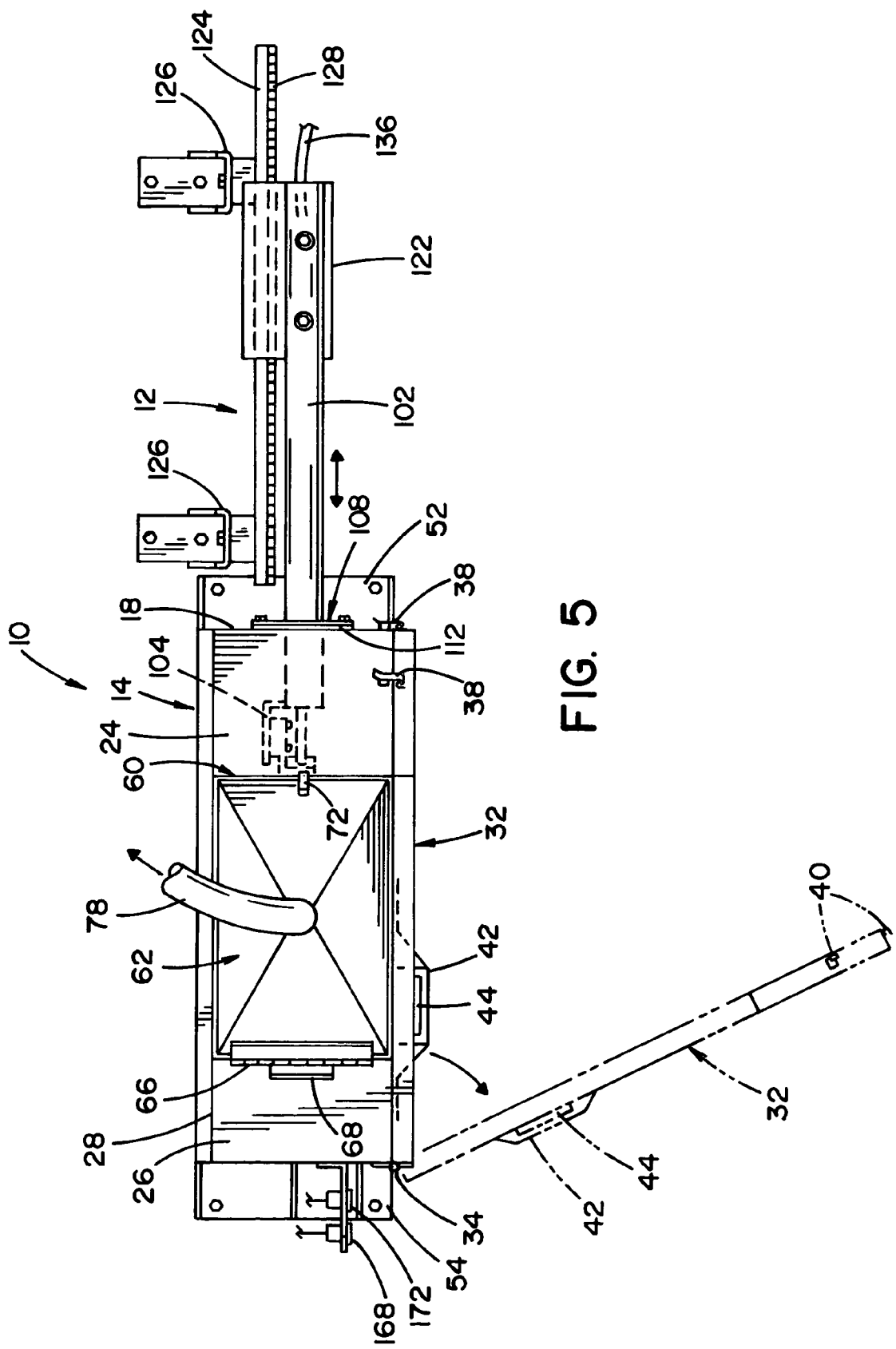
FIG. 5 is a plan view of the system of FIG. 3.

A first side support 52 attaches to the first side wall 18. As seen in FIG. 4, a second side support 54 attaches to the second side wall 22. The side supports 52 and 54, in the depicted embodiment, are made from heavy gage angle iron. The side supports 52 and 54 facilitate attachment of the fume collection chamber 10 to a table or other work surface.

At the top of the lower chamber housing 14, a rectangular filter frame 60 attaches to the angled upper wall 24, the top wall 26, and the rear wall 28. A hood 62 pivotally mounts to the filter frame 60 so that it can be pivoted to provide access to a filter 64. The hood 62 in this embodiment includes a plurality of attached trapezoidal side walls that give the hood a prismatoidal configuration. The filter frame 60, the hood 62 and the filter 64 can take configurations other than those described. With reference to FIG. 4, the hood 62 pivotally attaches to the filter frame 60 via a horizontal hinge 66 so that the hood 62 can be flipped upward to provide access to the filter 64 (FIG. 3). A hood stop 68 attaches to the filter frame 60 and limits the rotational movement of the hood 62. The hood stop 68 can be made from a piece of angle iron or other suitable material. A toggle clamp 72 attaches to the hood 62 and cooperates with a hook 74 attached to the filter frame 60. The toggle clamp 72 and hook 74 can be used to firmly close the hood 62 towards the frame 60. With the toggle clamps 72 for the hood 62 and the toggle clamps 38 for the door 32 cooperating with the corresponding hooks 74 and 40, respectively, the fume collection chamber is sufficiently closed to run fume generation and total fume emission tests.

As mentioned above, the movable hood 62 provides access to the filter 64 from the outside of the fume collection chamber 10. Access to the filter 64 can be provided by other movable structures and/or removable lids, and the like. As just one example, the filter frame 60 can include a movable and/or removable side lid that can provide selective access to the filter. In this embodiment, the filter can be slid out from the filter frame 60 from the outside of the fume chamber 10. Also, the hood 62 can be completely removed from the housing 14, e.g. no hinge 66 is provided. No matter the manner in which access is provided to the filter 64, care should be taken when removing the filter 64 from the fume collection chamber 10. Prior to running an emissions test and after running the emissions test, the filter 64 is weighed. The difference in weight of the filter 64 coincides with the emissions generated during welding. Accordingly, if care is not taken when removing the filter 64, and some of the material collected by the filter is lost during removal, the results of the test will be inaccurate.

A hose connector 76 attaches to the top of the hood 62 and is configured to cooperate with a hose 78 that is in communication with a vacuum source 80. The location of the connector 76 is chosen so that fumes generated during the welding test pass through the filter 64. The fume collection chamber 10 can include an air inlet in one of the side walls and/or the door 32 to facilitate air flow toward the vacuum source 80. The connector 76 can be attached elsewhere to the housing to encourage air flow through the filter 64. The hood 62 tapers toward the connector 76. The upper angled wall 24 and the inner baffle 46 also taper towards the hood 62. Fumes generated during the welding tests pass through the filter 64. The filter 64 is made of a filter media having an initial efficiency of 98.5%+ on 0.4-0.5 micron particles. One example of such a filter is an electrostatic filter. Another example of such a filter is an HEPA filter. By providing a filter 64 having such a high initial efficiency, the need for a secondary filter is eliminated or greatly reduced.

Figure 7:
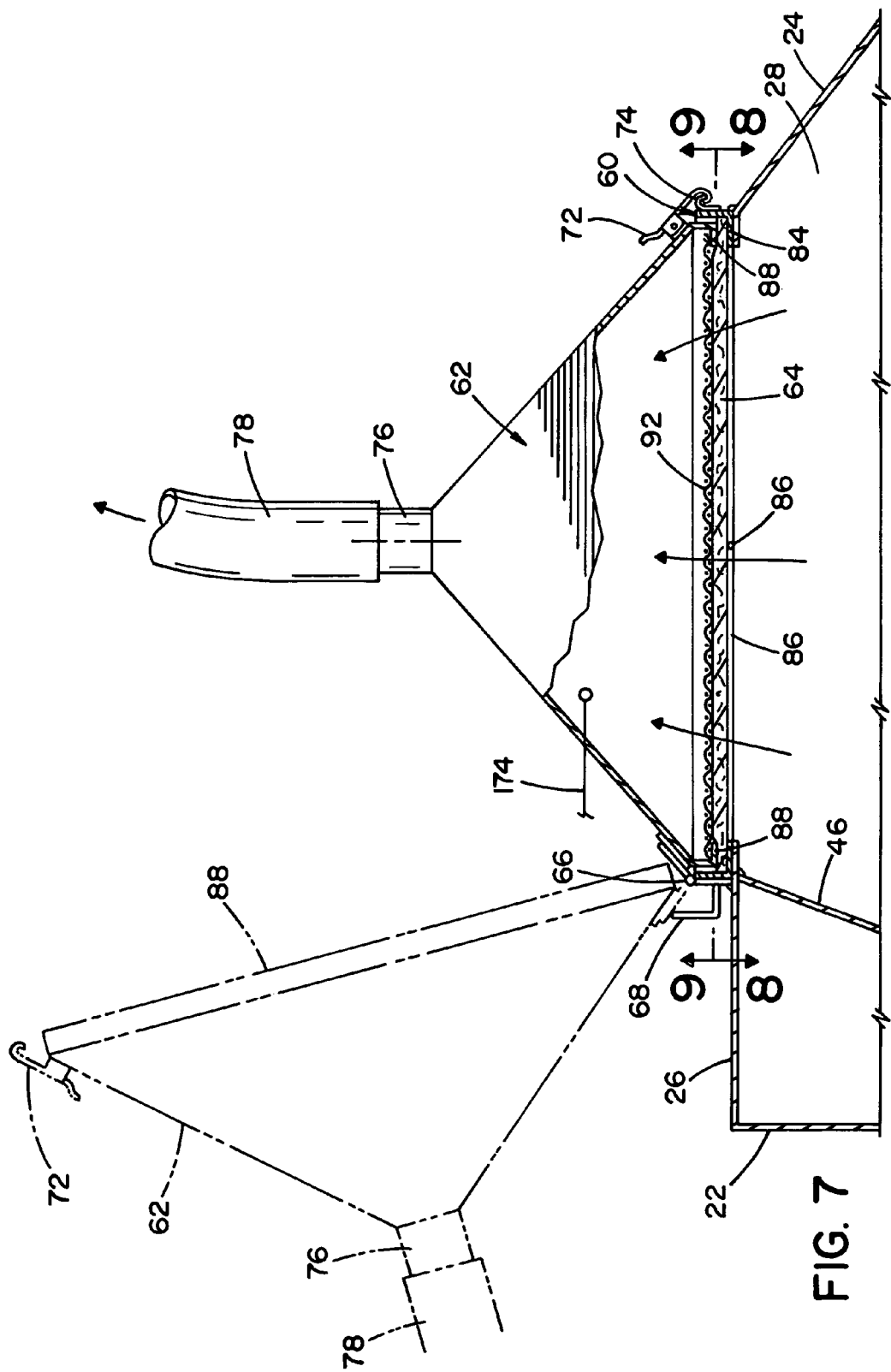
FIG. 7 is an elevation view of a hood of the fume collection chamber of FIG. 3 with the hood shown in an open position in phantom.
Figure 8:
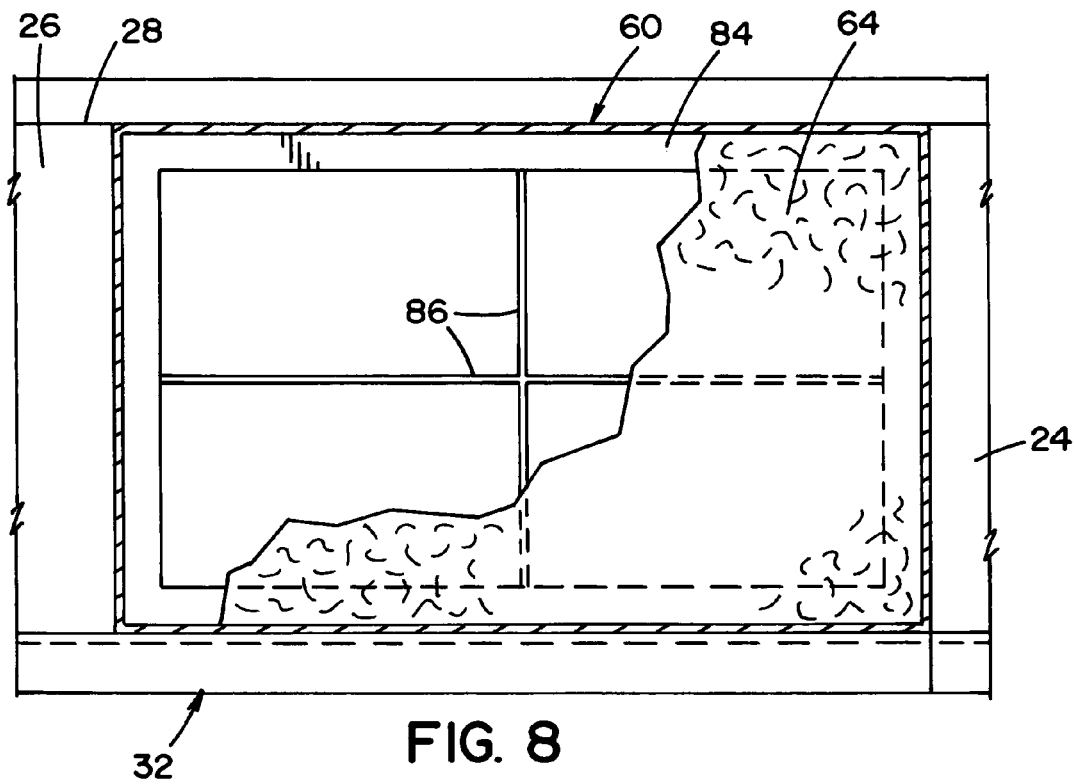
FIG. 8 is a cross section taken at line 8-8 in FIG. 7.
Figure 9:
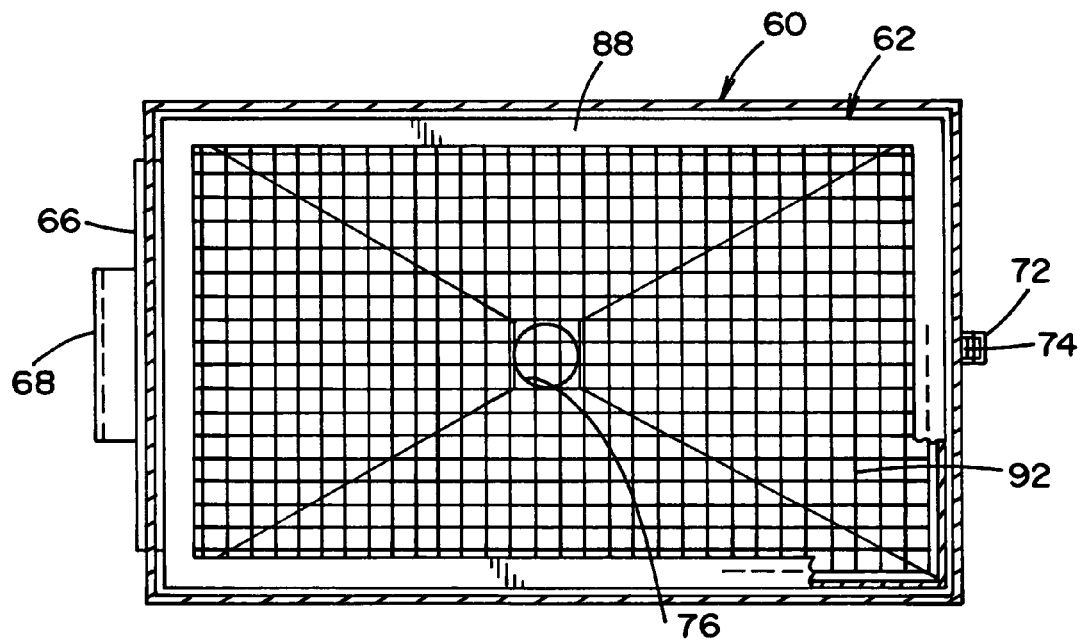
FIG. 9 is a cross section taken at line 9-9 in FIG. 7.

As seen in FIG. 7, the filter frame 60 has an L-shaped configuration in cross section and the filter 64 rests on a lower leg 84 of the filter frame 60. As seen in FIG. 8, transverse support rods 86 span opposite sides of the filter frame 60 attaching to the lower leg 84. Such configuration precludes the filter 64 from falling out while a test is running. Also, the support rods 86 have a small surface area, as compared to the surface area of the filter 64, so that they do not impede airflow through the filter. A gasket can be provided around the periphery of the filter 64.

With reference back to FIG. 7, the hood 62 includes a lower flange 88, which acts as an internal screen support, upon which a screen 92 is mounted. The filter 64 is sandwiched between the screen 92 and the lower leg 84 of the filter frame 60 when the hood 62 is in its closed position as shown in FIG. 7. In the embodiment depicted, removal of the filter 64 is relatively simple in that the toggle clamp 72 is detached from the hook 74 and the hood 62 is flipped upward providing access to the filter 64.

The automated welding assembly 12 allows for repeatable welding tests to be performed in the fume chamber 10. The automated welding assembly 12 includes a welding gun 100 rotatably attached to a welding gun arm 102 at a welding gun arm base 104. The movable connection is provided between the welding gun 100 and the welding gun arm base 104 to allow for rotation of the welding gun 100 to change its drag angle.

Figure 6:
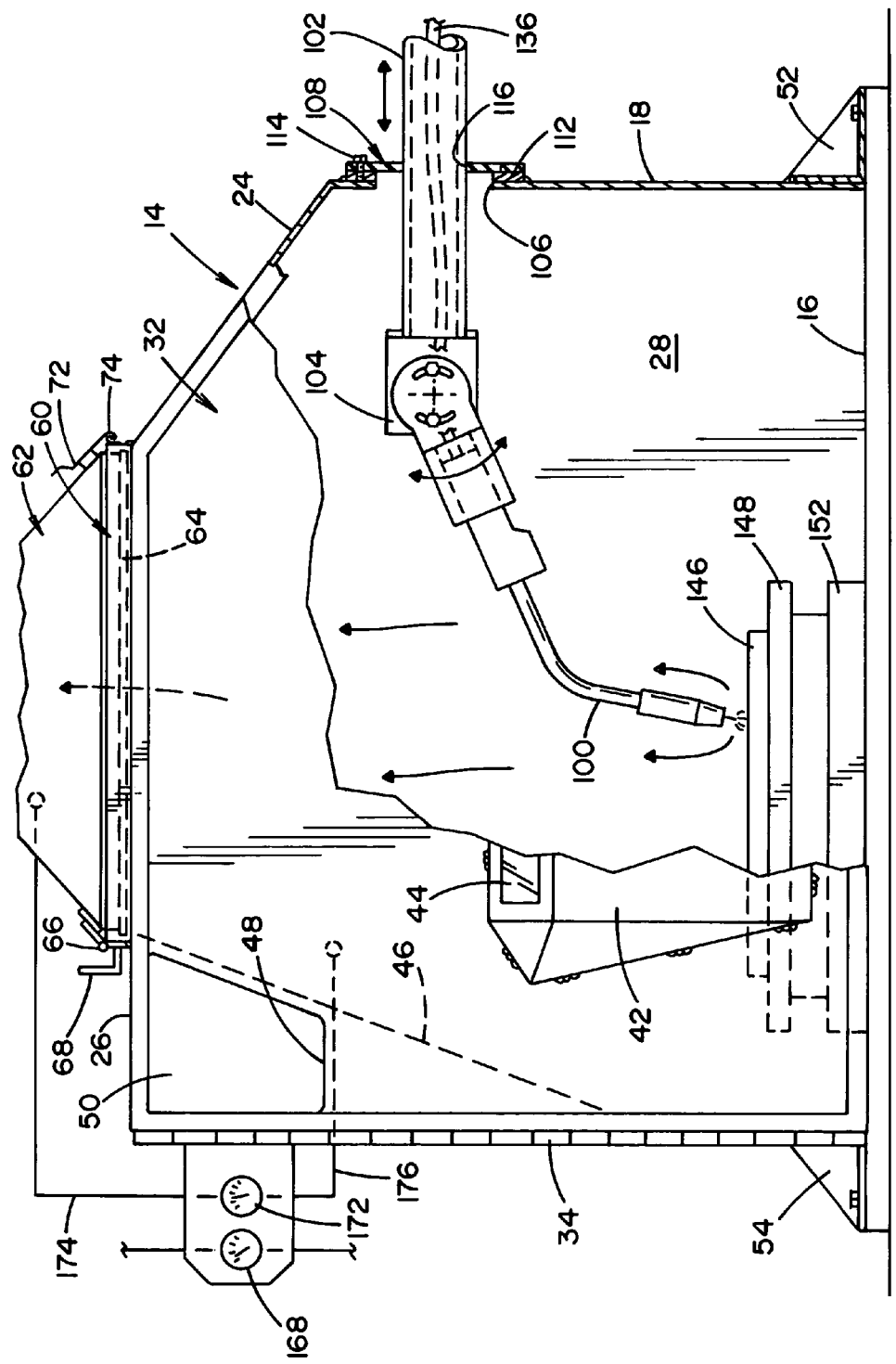
FIG. 6 is an elevation view of a lower housing of the fume collection chamber of FIG. 3 with a portion of a door of the chamber broken away to show a portion of the automated welding assembly disposed in the chamber.

With reference to FIG. 6, the welding gun arm 102 extends through an opening 106 in the first side wall 18 of the lower housing 14. A gasket 108 mounts to a mounting plate 112 that is attached to the side wall 18 via fasteners 114. The gasket 108 can be a circular rubber boot, or other known gasket. The gasket 108 includes a central opening 116 and a plurality of radially extending slits 118 (FIG. 3) that radiate equidistant from the opening 116. As depicted by the arrow in FIG. 6, the arm 102 travels horizontally in and through the opening 116 and the slits 118 (FIG. 3) allow the gasket to easily flex so that the arm 102 does not catch on the gasket 108. For a tighter fit, the central opening 116 of the gasket 108 can have a slightly smaller radius than the radius of the arm 102. The gasket 108 limits the path through which fumes can exit the chamber 10. In alternative embodiments, the gasket can take other configurations to account for the horizontal movement of the gun arm 102.

With reference to FIG. 3, the gun arm 102 attaches to a carriage 122, which includes a drive mechanism (not shown), e.g. a motor, to move the gun arm 102 in a horizontal direction. The carriage 122 rides along a rail 124 that is mounted to rail supports 126. The rail 124 can include a traction track 128 that cooperates with gearing (not shown) on the carriage 122. Such a carriage and rail assembly device is available from BUG-O® Systems of Pittsburgh, Pa. The carriage and rail assembly can include a controller 130 (FIG. 4), e.g. limit switches, a timer, etc., to control the travel of the gun arm 102 so that repeatable tests can be performed. The limit switches are set to preclude the gun arm base 104 from contacting the first side wall 18 and to preclude the gun 100 from contacting the angled inner wall 46.

With reference to FIG. 4, wire 132 from a wire source, such as a spool 134, is fed through a flexible conduit 136 by a wire feeder 138 to the welding gun 100. The gun arm 102 is hollow to receive the conduit 136 and wire 132. A welder 142 provides the desired electrical output at the welding gun 100.

The welding gun 100 deposits a weld on a work piece 146 that is supported on a welding table 148. The welding table 148 mounts to a milling table 152. The milling table 152 supports the welding table 148 in such a manner that the welding table is adjustable in both a horizontal and vertical direction. Other conventional mechanisms can be used to provide an adjustable welding table 148. The adjustable welding table 148, in conjunction with the adjustable welding gun 100 allows for adjustment of distance between the gun 100 and the work piece 146 and the location of the weld on the work piece. The distance that the electrode extends from the gun can also be adjusted.

With reference back to FIG. 4, air with the fumes removed exits the fume collection chamber 10 via connector 76 which communicates with the hose or conduit 78. The hose 78 communicates with the vacuum source 80 to draw air from the fume collection chamber towards the vacuum source through the filter. A metering orifice 162, which can include an adjustable valve or the like, is provided on the conduit 78 between the fume chamber 10 and the vacuum source 80 to regulate the air flow through the fume collection chamber 10. The vacuum source 80 can be a conventional shop vacuum that includes a filter, which can act as a secondary filter for the system. Sensors 166 on the conduit 160 on opposite sides of the metering orifice 162 can detect the airflow through the metering orifice to control air draw through the chamber. The sensors 166 can communicate with a first pressure gage 168, such as a magnehelic gage, to detect the pressure drop across the metering orifice.

In addition to the first pressure gage 168 that communicates with the sensors 166, a second pressure gage 172, such as a magnehelic gage, can be provided to measure the pressure drop across the filter 64. The second gage 172 can communicate with the downstream side of the filter 64 via line 174 and communicates with the downstream side of the filter 64 via line 176. The difference in pressure can be measured to determine that the test is running satisfactorily.

A device for use in welding fume collection processes has been disclosed with reference to preferred embodiments. Modifications and alterations will occur to those upon reading and understanding the preceding detailed description. The invention is not limited to only those embodiments described. Instead, the invention is defined by the appended claims and the equivalents thereof.

The invention claimed is:

1. A fume collection chamber assembly for use in a system for measuring fume generation rates and fume emissions of welding and allied processes, the assembly comprising:

a fume chamber housing including an opening for receiving a welding gun arm;

a door attached to the housing for providing access to inside the housing;

a filter support connected to the housing and configured to support an associated filter;

a hood movably connected to the housing for providing access to the associated filter supported by the filter support, wherein the hood is configured to allow for access to the associated filter from outside the fume chamber housing;

a connector attached to the hood and configured to communicate with a vacuum source, wherein the connector is situated with respect to the housing such that fumes moving from the fume chamber housing towards the connector pass through the associated filter supported by the filter support.

2. The assembly of claim 1, further comprising a vertically oriented hinge that attaches the door to the housing.

3. The assembly of claim 1, further comprising a viewing window in the door.

4. The assembly of claim 1, further comprising a gasket interposed between the door and the housing.

5. The assembly of claim 1, further comprising a clamp assembly for securing the door in a closed position.

6. The assembly of claim 1, further comprising a horizontally oriented hinge that attaches the hood to the housing.

7. The assembly of claim 1, further comprising a hinge that attaches the hood to the housing and a hood stop mounted adjacent the hinge, wherein the hood stop is shaped to limit pivotal movement of the hood.

8. The assembly of claim 7, wherein the hood stop comprises a L-shaped metal bar.

9. The assembly of claim 1, wherein the hood attaches to a top of the housing above the filter support.

10. The assembly of claim 1, wherein the hood has prismatoidal configuration.

11. The assembly of claim 1, wherein the hood is removable from the housing.

12. The assembly of claim 1, further comprising a clamp assembly for securing the hood to the housing.

13. The assembly of claim 1, further comprising an inner baffle extending from a side wall of the housing towards the hood.

14. The assembly of claim 1, further comprising a welding plate moveable in at least one axis within the housing.

15. The assembly of claim 14, wherein the welding plate is moveable in at least two perpendicular axes within the housing.

16. The assembly of claim 1, further comprising at least one gage for detecting differential pressure across the filter.

17. The assembly of claim 1, further comprising a gasket mounted to the housing that includes the opening for receiving a welding gun arm, wherein the gasket at least partially surrounds the opening in the housing for receiving a welding gun arm.

18. The assembly of claim 17, wherein the gasket comprises a circular rubber boot including a central opening and slits radiating from the central opening.

19. The assembly of claim 18, wherein the slits radiate equidistant from a center of the gasket to align with an edge of the opening for receiving a welding gun arm.

20. The assembly of claim 1, further comprising a shelf attached to the housing.

21. The assembly of claim 20, wherein the door includes an opening aligned with the shelf for providing access to the shelf when the door is closed.

22. A system for measuring fume generation rates and total fume emission of welding and allied processes, the system comprising:

a fume collection chamber comprising a plurality of connected side walls, a filter support mounted to at least one of the side walls, a filter supported by the filter support, a moveable lid connected to at least one of the walls configured to provide access from outside the fume collection chamber to the filter, and a door attached to at least one of the walls, wherein at least one side wall includes a gun opening and at least one side wall defines a fume opening; and an automated welding assembly comprising a movable gun arm extending through the gun opening.

23. The system of claim 22, further comprising a gasket at least partially surrounding the gun opening in the at least one side wall.

24. The system of claim 23, wherein the gasket comprises a flexible boot having a central opening that receives the gun arm.

25. The system of claim 24, wherein the gasket includes a plurality of radial slits emanating from the central opening.

26. The system of claim 24, wherein the central opening has a diameter that is less than a cross-sectional diameter of the gun arm.

27. The system of claim 22, further comprising a vacuum source in communication with the fume opening.

28. The system of claim 27, further comprising a metering orifice interposed between the vacuum source and the fume opening.

29. The system of claim 28, further comprising a sensor interposed between the vacuum source and the fume opening.

30. The system of claim 28, further comprising a first sensor upstream from the metering orifice and a second sensor downstream from the metering orifice, wherein the sensors measure the pressure drop across the metering orifice.

31. The system of claim 22, wherein the filter has an initial efficiency of at least about 98.5%+ on 0.4-0.5 micron particles.

32. The system of claim 22, wherein the filter is an electrostatic filter.

33. The system of claim 22, wherein the filter is a HEPA filter.

34. The system of claim 22, further comprising a pressure gage in communication with the fume collection chamber upstream from the filter support.

35. The system of claim 34, wherein the pressure gage is in communication with the fume collection chamber downstream from the filter support.

36. The system of claim 22, wherein the automated welding assembly comprises a rail and carriage, wherein the gun arm is connected to the carriage.

37. The system of claim 36, wherein the automated welding assembly comprises a welding gun adjustably connected to the gun arm.

38. The system of claim 37, wherein the automated welding assembly comprises a welder for providing electrical output to the welding gun.

39. A fume collection chamber assembly for use in a system for measuring fume generation rates and fume emissions of welding and allied processes, the assembly comprising:

a chamber housing;

a first movable structure connected to the housing and configured to provide access to inside the chamber housing;

a filter support connected to the chamber housing;

a second movable structure connected to the housing and configured to provide access to the filter support from outside the chamber housing; and a welding table disposed in the chamber housing.

40. The assembly of claim 39, wherein the first movable structure is a door hingedly connected to the chamber housing.

41. The assembly of claim 39, wherein the second movable structure is a hood hingedly connected to the housing.

42. The assembly of claim 39, further comprising a filter element supported by the filter support.

43. The assembly of claim 42, wherein the filter element comprises a filter media having an initial efficiency of 98.5%+ on 0.4-0.5 micron particles.

44. The assembly of claim 42, wherein the filter element comprises an electrostatic filter.

45. The assembly of claim 42, wherein the filter element comprises a HEPA filter.

* * * * *